United States Patent
Miner et al.

(10) Patent No.: US 6,690,655 B1
(45) Date of Patent: Feb. 10, 2004

(54) LOW-POWERED COMMUNICATION SYSTEM AND METHOD OF OPERATION

(75) Inventors: Mark Charles Miner, Foxboro, MA (US); Michael Jaimie Cooper, Marietta, GA (US)

(73) Assignee: Motorola, Inc., Schaumburg, IL (US)

( * ) Notice: Subject to any disclaimer, the term of this patent is extended or adjusted under 35 U.S.C. 154(b) by 37 days.

(21) Appl. No.: 09/692,427

(22) Filed: Oct. 19, 2000

(51) Int. Cl.[7] ............................................... H04B 7/005
(52) U.S. Cl. ....................... 370/278; 370/311; 370/466; 455/450
(58) Field of Search ........................... 379/93.01; 348/9; 455/5.1, 561, 4.1, 4.2, 450; 370/395, 508, 458, 294, 421, 356, 329, 486, 347, 348, 295, 442, 281, 466, 467, 311, 278, 343, 430, 480; 710/8; 725/88

(56) References Cited

U.S. PATENT DOCUMENTS

| | | | | |
|---|---|---|---|---|
| 5,754,961 A | * | 5/1998 | Serizawa et al. | 455/517 |
| 5,768,280 A | * | 6/1998 | Way | 370/486 |
| 5,889,765 A | * | 3/1999 | Gibbs | 370/294 |
| 6,055,242 A | * | 4/2000 | Doshi et al. | 370/458 |
| 6,075,972 A | * | 6/2000 | Laubach et al. | 455/5.1 |
| 6,112,232 A | * | 8/2000 | Shahar et al. | 709/217 |
| 6,233,235 B1 | * | 5/2001 | Burke et al. | 370/356 |

* cited by examiner

Primary Examiner—John Pezzlo
(74) Attorney, Agent, or Firm—Caroline Coker

(57) ABSTRACT

A communication system includes a network control facility (205), two downstream channels (212, 213), at least one remote interface unit (209, 210), and at least one communication device (201, 202) associated with each remote interface unit (RIU). Each RIU operates in one of two operating modes: a low power, standby mode and a high power, active mode. One downstream channel (212) is the primary downstream channel and is used by the network control facility to communicate user information and normal maintenance or control information to the RIU when the RIU is in the active mode. The other downstream channel (213) is the secondary downstream channel and is used by the network control facility to communicate special control information, such as a wake-up command, to the RIU when the RIU is in standby mode. The wake-up command instructs the RIU to transition from standby mode to active mode in order to receive user or control information over the primary downstream channel. Alternatively, the RIU may transition from standby mode to active mode on its own upon detecting a desire (e.g., off-hook signal) by the RIU's associated communication device to communicate in the system. The secondary downstream channel utilizes a substantially slower transmission speed (e.g., a lower order modulation) than does the primary downstream channel, thereby enabling the RIU to consume substantially less power when in standby mode than when in active mode, without adversely impacting the throughput rate of the primary downstream channel.

36 Claims, 4 Drawing Sheets

LOW-POWERED COMMUNICATION SYSTEM AND METHOD OF OPERATION

FIELD OF THE INVENTION

The present invention relates generally to communication systems and, in particular, to a communication system in which the system infrastructure at least occasionally provides power to system subscriber devices.

BACKGROUND OF THE INVENTION

Communication systems are known to include a system infrastructure and a plurality of subscriber devices. In most communication systems, the subscriber devices (e.g., cellular telephones or wireline modems) include their own DC power source (e.g., a battery or an AC-to-DC transformer which is plugged into an AC wall outlet). However, in standard telephone systems, the system infrastructure provides the minimal DC power necessary to power the subscriber devices (with the exception of cordless telephones which include their own AC-to-DC transformers). The infrastructure provides the power to the subscriber devices in standard telephone systems to ensure that, in the event of a power outage at a subscriber device location, the subscriber device user will still have telephone service, especially with respect to so-called "lifeline services", such as "911" and others.

Telephony service has traditionally been delivered to consumers by regional telephone companies via circuit switched technologies. However, cable (community access television (CATV)) operators are beginning to offer telephony services over their cable systems, using standardized modems and a packetized Internet Protocol (IP) technology generally known as "voice-over-IP (VoIP)". An exemplary prior art two-way cable system is illustrated in block diagram form in FIG. 1.

The prior art cable system includes headend equipment 101, a hybrid fiber coaxial (HFC) cable plant 103, a plurality of cable modems 105, 106 (two shown), and a corresponding plurality of subscriber communication devices 107, 108 (two shown) coupled to the cable modems 105–106 via corresponding communication links 116, 117. The headend equipment 101 includes processors, routers, switches, a broadband downstream transmitter, upstream receivers, splitters, combiners, subscriber databases, network management stations, dynamic host configuration protocol (DHCP) and trivial file transfer protocol (TFTP) servers, call agents, media gateways, and billing systems. The HFC cable plant 103 includes fiber optic cables, coaxial cables, fiber/coax nodes, amplifiers, filters, and taps which support transmissions from the headend equipment 101 to the cable modems 105, 106 over a shared downstream channel 110 and transmissions from the cable modems 105, 106 to the headend equipment 101 over a shared upstream channel 112.

Each channel 110, 112 utilizes a respective transmission protocol to communicate information over the channel 110, 112. Typically, the modulation used to convey information over the downstream channel 110 (e.g., 64-ary quadrature amplitude modulation (QAM)) is of a higher order than the modulation used to convey information over the upstream channel 112 (e.g., differential quaternary phase shift keying (DQPSK) or 16-ary QAM), resulting in higher speed downstream transmissions than upstream transmissions. Cable systems in which upstream transmission speeds are less than downstream transmission speeds are typically referred to as "asymmetric" systems. Cable systems in which upstream transmission speeds are substantially equivalent to downstream transmission speeds are typically referred to as "symmetric" systems.

In addition to the particular type of modulation used on each channel 110, 112, the shared nature of each channel 110, 112 introduces other protocol requirements. For example, since the downstream channel 110 is shared, the downstream protocol includes addressing information and each cable modem 105, 106 monitors the downstream channel 110 for information packets addressed to it. Only information packets addressed to a particular cable modem 105, 106 (or the attached communication devices 107, 108) or addressed to all cable modems 105, 106 (or the attached communication devices 107, 108) (e.g., broadcast messages) are processed by the cable modem 105, 106 and forwarded to the associated subscriber communication device 107, 108 as appropriate (e.g., telephone, personal computer, or other terminating device). Since the upstream channel 112 is shared, an upstream channel access protocol is used to reduce the likelihood of collisions of communicated information emanating from the cable modems 105, 106. A number of multiple access protocols exist to define upstream channel access, including well-known protocols such as ALOHA, slotted-ALOHA, code division multiple access (CDMA), time division multiple access (TDMA), TDMA-with collision detect, and carrier sense multiple access (CSMA).

Most two-way cable systems abide by and use the upstream and downstream channel protocols defined in the recently-published Data-Over-Cable System Interface Specification (DOCSIS) Version 1.0, which specification is incorporated by this reference as if fully set forth herein. The upstream protocol defined by the DOCSIS standard is a TDMA approach in which timing is controlled by the headend equipment 101 (referred to as the "cable modem termination station" (CMTS) in the DOCSIS standard) and communicated to the cable modems 105, 106 via time stamp synchronization messages transmitted over the downstream channel 110. Thus, in order for upstream communication to occur in an orderly, high quality manner, a time reference in each cable modem 105, 106 must be substantially synchronized with a similar reference in the headend equipment 101 before the modem 105, 106 begins transmitting information provided by the subscriber communication device 107, 108; otherwise, a transmission from one modem 105 may collide with a transmission from another modem 106.

The headend equipment 101 is typically coupled via an appropriate communication link 119, such as a fiber distributed data interface (FDDI) link or a 100 baseT Ethernet link, to an external network 114, such as the public switched telephone network (PSTN) or a wide area packetized network, such as the Internet. Thus, the two-way cable system provides communication connectivity between the subscriber communication devices 107, 108 and other similar devices, Internet servers, computer networks, and so forth via the external network 114.

To support the aforementioned "lifeline services", cable system operators must provide power (at least temporarily during local power outages) to the cable modems 105, 106 and their attached subscriber communication devices 107, 108 from the headend equipment 101 via the cable plant 103. However, present-day cable modems 105, 106 consume considerable amounts of power (on the order of 9–12 watts per modem currently with a reduction to 4–6 watts as new technologies become available, under normal operating conditions), with the modem's downstream receiving and processing circuitry playing the most significant role in power consumption. Considering that, in a typical two-way cable system, the headend equipment 101 may service thousands of cable modems 105, 106. Supplying power to such modems 105, 106, even temporarily during local power outages, creates an overwhelming burden on the cable system operators, likely resulting in increased operating and subscription costs.

One approach to reducing the amount of power consumed by the cable modems 105, 106 is to reduce the transmission rate of the downstream channel 110 (e.g., through the use of a low order modulation, such as QPSK or frequency shift keying (FSK)) and, thereby, reduce the power required by each modem 105, 106. While some of the power savings is realized as a result of reduced processing power required to handle the lower data rate, the bulk of the power savings is realized by the requirement that higher modulation schemes require higher-performing lower-noise RF components, which generally require more power. However, such a change in downstream channel modulation would undesirably, and in many cases unacceptably, reduce the maximum downstream channel bit rate.

Therefore, a need exists for a communication system and method of operation that reduces the average power consumed by a cable modem without negatively impacting downstream channel transmission rates, thereby reducing headend equipment power sourcing requirements to facilitate telephony services and maintaining current data-over-cable downstream throughput rates.

DETAILED DESCRIPTION OF A PREFERRED EMBODIMENT

Generally, the present invention encompasses a communication system, such as a two-way cable system operating in accordance with the DOCSIS standard, and a method of operation therein. The communication system includes a network control facility, an information distribution network, at least one remote interface unit (RIU), and at least one communication device associated with and operably coupled to each RIU. The information distribution network couples the RIUs to the network control facility and supports two downstream channels for communicating information from the network control facility to the RIUs and an upstream channel for communicating information from the RIUs to the network control facility. Each upstream and downstream channel uses a respective protocol for communicating information over the particular channel.

Each RIU operates in one of two operating modes. The first RIU operating mode is a low-power, standby mode and the second RIU mode is a high-power, active mode. One downstream channel is the primary downstream channel and is used by the network control facility to communicate user information and normal maintenance or control information to the RIU when the RIU is in the active mode. The other downstream channel is the secondary downstream channel and is used by the network control facility to communicate special control information, such as a wake-up command, to the RIU when the RIU is in standby mode. The wake-up command instructs the RIU to transition from standby mode to active mode in order to receive user or control information over the primary downstream channel. The secondary downstream channel utilizes a substantially slower transmission speed than does the primary downstream channel, thereby enabling the RIU to consume substantially less power when in standby mode than when in active mode, without adversely impacting the throughput rate of the primary downstream channel.

By configuring a communication system with two downstream channels in this manner, the present invention enables the use of a dual-mode RIU (e.g., a cable modem or a wireless modem) that operates a minimal protocol engine in standby mode to monitor for wake-up or other control commands communicated over the secondary downstream channel and operates a standard protocol engine in active mode to receive control and user information over the primary downstream channel. Such a dual-mode RIU consumes substantially less power on average than does a conventional prior art cable modem which is continually monitoring a single, high speed downstream channel for user or control information addressed to it. The reduction in average individual RIU power results in an N-fold reduction in the power required to be sourced by the network control facility to ensure continuous communication service for N RIUs and their associated subscriber communication devices.

Figure 1:
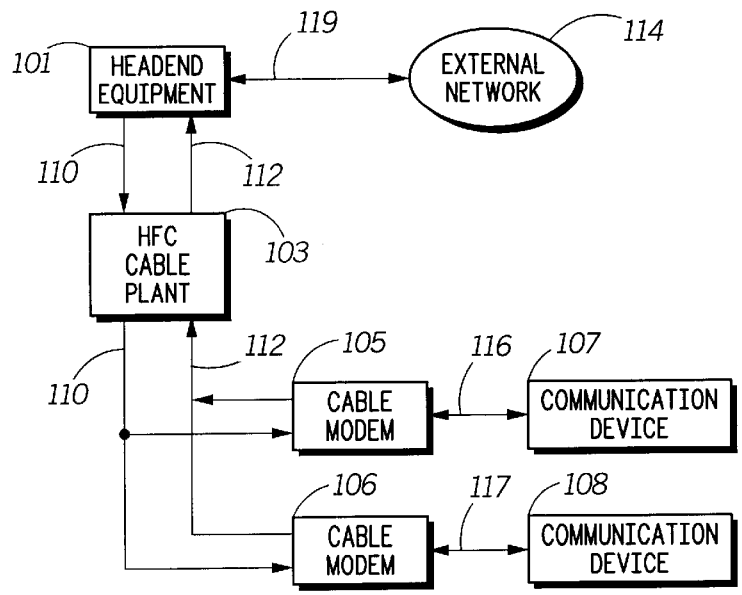
FIG. 1 is an electrical block diagram of a typical prior-art two-way cable communication system.
Figure 2:
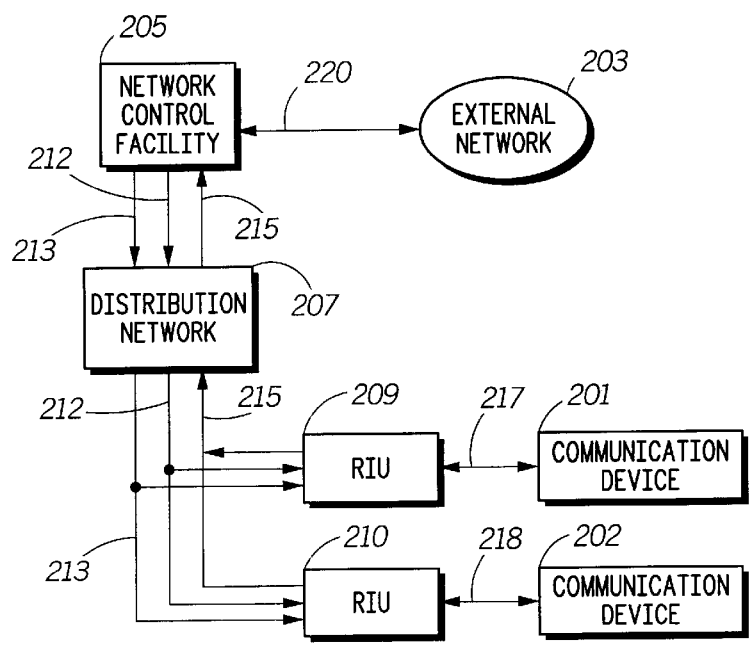
FIG. 2 is an electrical block diagram of a communication system in accordance with the present invention.

The present invention can be more fully understood with reference to FIGS. 2–7, in which like reference numerals designate like items. FIG. 2 is an electrical block diagram of a communication system in accordance with the present invention. The communication system includes a network control facility 205, an information distribution network 207, a plurality of remote interface units (RIUs) 209, 210, and a plurality of communication devices 201, 202 associated with the RIUs 209, 210. The distribution network 207 preferably supports two downstream channels 212, 213 for communicating information from the network control facility 205 to the RIUs 209, 210 and at least one upstream channel 215 (one shown) for communicating information from the RIUs 209, 210 to the network control facility 205. Each RIU 209, 210 is operably coupled to one or more associated communication devices 201, 202 via an appropriate communication link 217, 218, such as a telephone line, power line, wireless link or Ethernet-like connection. While a traditional telephone line has supported one line of service (with multiple phones), new technology supports multiple lines of service as well as multiple phones. Additionally, telephony service can coexist with data services on the same communication link 217, 218 regardless of whether the particular RIU 209, 210 services only one communication device 201, 202 (as depicted in FIG. 2), or multiple communications devices serviced over a local area network (LAN) or private branch exchange (PBX). The network control facility 205 is preferably coupled to an external network 203, such as the PSTN, the Internet (directly or via an Internet Service Provider (ISP)) or some other wide area network (WAN) or WAN provider, via an appropriate communication link 220, such as an FDDI link, a 100 baseT Ethernet link, an OC24 link or any partial derivative thereof, or some other appropriate broadband link that supports the media appropriate protocol (for example IP).

The network control facility 205 preferably comprises headend equipment of a two-way cable system with appropriate hardware and software modifications to implement the present invention, but may alternatively comprise any type of communications network whereby the topology is represented by a one-to-many-nodes architecture. By a one-to-many-nodes architecture, it is meant that the communications path from the central point out to the nodes is a single communications path where "information" is addressed to a particular unit and the nodes must filter out only the information intended for that node. Communications that is intended to move information from the nodes back to the central point must rely on a shared channel whereby some synchronization protocol must be used to eliminate channel access conflicts from multiple nodes attempting to send information at the same time. A preferred network control facility 205 is described in detail below with respect to FIG. 3. The distribution network 207 preferably comprises an HFC cable plant, but may alternatively comprise a wireless network, such as a cellular telephone network, a wireless data network, or any wireless or wireline network that supports the transfer of voice, data and/or video packets. Each RIU 209, 210 preferably comprises a cable modem or wireless modem with appropriate hardware and software modifications to implement the present invention, but may alternatively comprise set top boxes, media terminal adapters or any communication device which is expected to be always powered on. A preferred RIU 209, 210 is described in detail below with respect to FIG. 4.

Figure 3:
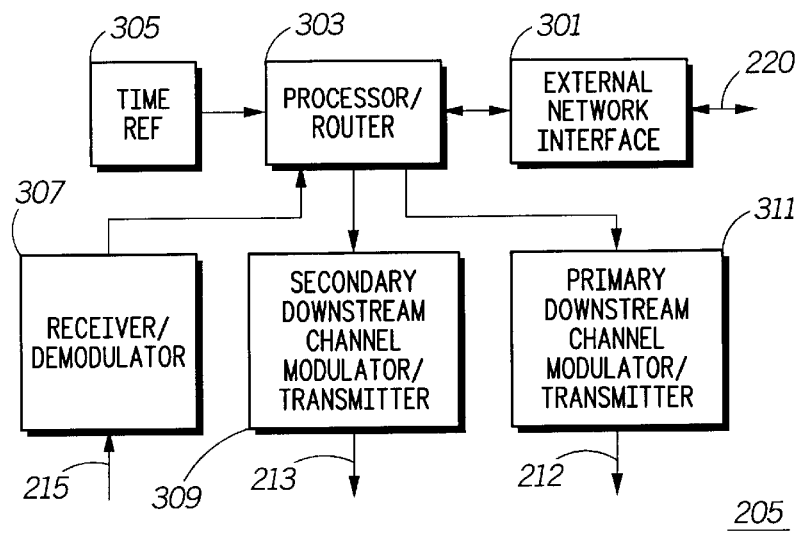
FIG. 3 is an electrical block diagram of a preferred network control facility for use in the communication system of FIG. 2.

FIG. 3 is an electrical block diagram of a preferred network control facility 205 for use in the communication system of FIG. 2. The network control facility 205 comprises an external network interface 301, a processor/router 303, a timing reference 305, a receiver/demodulator 307, a primary downstream modulator/transmitter 311, and a secondary downstream modulator/transmitter 309. The external network interface 301 comprises an interface appropriate to couple the processor/router 303 to the communication link 220 coupling the network control facility 205 to the external network 203. Accordingly, the external network interface 301 might comprise an FDDI interface, 100 baseT Ethernet interface, ATM, SONET or POS interfaces, or some other appropriate interface depending on the selection of the external network communication link 220.

The processor/router 303 preferably comprises a central processing unit including one or more digital signal processors (DSPs) and/or microprocessors operating under the control of stored software programs to, inter alia, perform typical signal processing, routing, channel allocation, and call management functions. The processor/router 303 also generates a limited command set for use in the secondary downstream channel protocol as described in detail below. The receiver/demodulator 307 preferably comprises a conventional digital receiver/demodulator capable of receiving and demodulating DQPSK-modulated, 16-ary QAM-modulated signals, or any other modulation scheme communicated by the RIUs 209, 210 over the upstream channel 215. The timing reference 305 preferably comprises a processor-controlled phase locked loop.

The primary downstream modulator/transmitter 311 preferably comprises a conventional digital modulator/transmitter capable of modulating baseband information signals with 64-ary QAM or a higher order modulation, and communicating such modulated information in a preferred 6 MHz (or 8 MHz internationally) primary downstream channel 212 centered at a frequency allocated by the processor/router 303. For systems operating in accordance with the DOCSIS downstream channel protocol, the center frequency of the primary downstream channel 212 allocated by the processor/router 303 is in the 88–860 MHz frequency range.

The secondary downstream modulator/transmitter 309 preferably comprises a conventional digital modulator/transmitter capable of modulating baseband information signals with frequency shift keying (FSK), QPSK, or some other modulation that is of a lower order than the modulation applied by the primary downstream modulator/transmitter 311, and communicating such modulated information in one embodiment in a 1000 kHz secondary downstream channel 213 centered at a frequency allocated by the processor/router 303, but which is outside the 6 MHz bandwidth of the primary downstream channel 212. The center frequency of the secondary downstream channel 213 is preferably in the 42–860 MHz frequency range, but any frequency range outside the actual frequency of the primary downstream channel 212 is acceptable. The processor/router 303, the receiver/demodulator 307, the primary downstream modulator/transmitter 311, and the secondary downstream modulator/transmitter 309 are preferably collectively embodied in a cable router, such as the CAS2000 Cable Router that is commercially available from Motorola, Inc. of Mansfield Mass., with appropriate hardware and software modifications to implement the secondary downstream channel modulator/transmitter 309 and generate the command set associated with the secondary downstream channel protocol as described in detail below.

Figure 4:
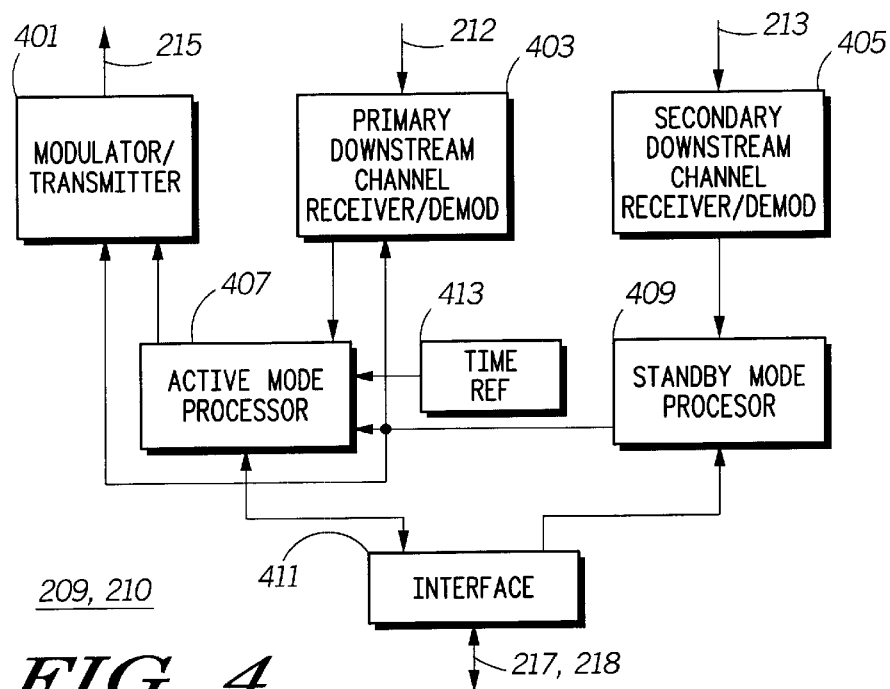
FIG. 4 is an electrical block diagram of a preferred remote interface unit for use in the communication system of FIG. 2.

FIG. 4 is an electrical block diagram of a preferred RIU 209, 210 for use in the communication system of FIG. 2. The RIU 209, 210 includes a modulator/transmitter 401, a primary downstream channel receiver/demodulator 403, a secondary downstream channel receiver/demodulator 405, an active mode processor 407, a standby mode processor 409, a communication device interface 411, and a timing reference 413. The modulator/transmitter 401 preferably comprises a conventional digital modulator/transmitter capable of modulating baseband information packets received from the active mode processor 407 currently with 16-ary QAM or QPSK modulations in accordance with the selected upstream channel transmission protocol, and communicating such modulated information in an upstream channel 215 centered at a frequency allocated by the network control facility 205. Other modulation modes may be utilized in future embodiments. For systems operating in accordance with the DOCSIS upstream channel protocol, the upstream channel center frequency allocated by the network control facility 205 is in the 5–42 MHz frequency range and would commonly occupy a channel width of either 200 kHz, 400 kHz, 800 kHz, 1600 kHz, or 3200 kHz as currently specified by DOCSIS. The communication device interface 411 comprises an interface appropriate to couple the standby mode and active mode processors 407, 409 to the communication link 217, 218 coupling the RIU 209, 210 to its associated communication device(s) 201, 202. Accordingly, the communication device interface 411 might comprise a telephone jack (plain old telephone service (POTS) interface), a data port such as Ethernet, new home networking interfaces such as HPNA, IEEE 802.11 wireless standard, HomeRF or PowerLine, or another appropriate interface depending on the selection of the particular communication device 201, 202.

The standby and active mode processors 407, 409 preferably comprise respective allocations of a single central processing unit which includes one or more DSPs and/or microprocessors operating under the control of stored software programs. Alternatively, each processor 407, 409 may comprise an individual DSP and/or microprocessor. The active mode processor 407 performs typical signal processing, routing and call management functions, as described in more detail below, after being activated by the standby mode processor 409. The standby mode processor 409 monitors the secondary downstream channel 213 and the communication link 217, 218 from the external communication device 201, 202 to detect a signal or message requiring the standby mode processor 409 to activate or de-activate the active mode processor 407, as described in more detail below.

The primary downstream receiver/demodulator 403 preferably comprises a conventional digital receiver/demodulator capable of receiving broadband radio frequency (RF) signals, preferably in the 88–860 MHz frequency range, and demodulating such signals in accordance with the primary downstream channel protocol to demodulate the RF signals and, thereby, produce baseband information signals for delivery to the active mode processor 407. The secondary downstream receiver/demodulator 405 preferably comprises a conventional digital receiver/demodulator capable of receiving narrowbandband RF signals, preferably in the 42–860 MHz frequency range, and demodulating such signals in accordance with the secondary downstream channel protocol to remove FSK, QPSK, or some other lower order modulation from the RF signals and, thereby, produce baseband information signals for delivery to the standby mode processor 409. All the elements 401"413 of the RIU 209, 210 are preferably collectively embodied in a cable modem, such as the SB4XXX Surf Board Cable Modem Line that is commercially available from Motorola, Inc. of Mansfield Mass., or the Motorola CentriQ cable telephony product line, with appropriate hardware and software modifications to implement the secondary downstream channel receiver/demodulator 405 and standby mode processor 409. The timing reference 413 preferably comprises a processor-controlled phase lock loop.

Referring now to FIGS. 2–5, operation of the preferred communication system occurs substantially as follows in accordance with the present invention. In systems in which the system infrastructure provides power to the system subscriber devices, the primary target for managing or reducing network power sourcing requirements is the RIU 209, 210 because a reduction in the power consumed by the RIU 209, 210 and any other customer premises equipment (CPE) is immediately scalable to every customer. Thus, small reductions in power consumption by each RIU 209, 210 will yield a significant reduction in the overall network power sourcing requirements.

One of the primary consumers of power within the RIU 209, 210 is the primary downstream channel receiver/demodulator 403. Typically, higher order modulation schemes, such as 64-ary QAM and 256-ary QAM are utilized in HFC cable plants on the downstream channel 212 in order to provide higher data rates. However, use of such higher order modulation schemes requires a much higher signal-to-noise ratio (SNR) which places increased performance requirements on the primary downstream channel receiver/demodulator 403, resulting in higher current draw and increased power consumption. As discussed above, one approach to reducing RIU power consumption would be to use a much lower order modulation scheme, such as FSK or QPSK, over a single downstream channel 212 at all times, thereby resulting in less RIU power consumption at the expense of a lower downstream bit rate. However, utilizing lower order modulation over a single downstream channel 212 does not maximize the bit rate achievable over such a channel 212 and, therefore, makes inefficient use of the premium downstream spectrum. Moreover, depending upon channel access rates for subscribers, such lower speed downstream rates achievable with FSK or QPSK modulation will likely not meet the rate requirements for the communication services being offered by the system operator.

By contrast, the present invention provides an average RIU power consumption reduction by using two downstream channels 212, 213 and a dual-mode RIU 209, 210, wherein one downstream channel 212 uses high order, high power-consuming downstream modulation techniques, such as 64-ary or 256-ary QAM, on an intermittent basis to communicate more critical user or control information when the RIU 209, 210 is in one mode (e.g., active mode) and the other downstream channel 213 uses low order, low power-consuming downstream modulation techniques, such as FSK or QPSK, for communication of control information (e.g., a limited command set) when the RIU 209, 210 is in its other mode (e.g., standby mode). The command set communicated over the low speed downstream channel 213 includes a command that instructs the RIU 209, 210 to transition from standby mode to active mode to receive information over the high speed downstream channel 212.

In accordance with the present invention, an RIU 209, 210 is installed at each subscriber's premises (e.g., home or business) and the network control facility 205 provides the interface between the information distribution network 207 and the external network 203 (e.g., the PSTN or an ISP). A single network control facility 205, such as cable system headend equipment or a wireless central control facility (e.g., a mobile switching office), may serve hundreds or thousands of RIUs 209, 210. In a preferred embodiment, the distribution network 207 supports two downstream communication channels 212, 213 (a high speed or high data rate, primary downstream channel 212 and a low speed or low data rate, secondary downstream channel 213) and a low speed upstream communication channel 215. The high-speed downstream channel 212 allows the network control facility 205 to communicate RIU-addressed information to any one or more of the RIUs 209, 210. The RIU circuitry required to continually monitor the high speed downstream channel 212 and process high speed downstream channel transmissions when the RIU 209, 210 is powered on (i.e., the primary downstream channel receiver/demodulator 403 and the active mode processor 407) is one of the primary consumers of network-supplied power.

The upstream channel 215 is a lower data rate channel which allows the RIUs 209, 210 to communicate information back to the network control facility 205. The upstream channel 215 is sometimes referred to as the "return" channel. Since the upstream channel 215 is a low data rate channel that is used intermittently (i.e., only when the RIU 209, 210 has information to send), the RIU circuitry used to send upstream channel information packets (e.g., the upstream modulator/transmitter 401) is a secondary source of network power consumption.

Each RIU 209, 210 preferably disables its primary downstream channel receiving and processing circuitry 403, 407 when the network control facility 205 does not have any user information or RIU or system maintenance control information to send to the RIU 209, 210, and enables such circuitry 403, 407 only when the network control facility 205 has such user information or maintenance control information to send to the RIU 209, 210 or the communication device user has information to send to another communication device user via the network control facility 205. Such temporary enablement of the primary downstream channel receiving and processing circuitry 403, 407 results in a substantial reduction in the average power consumed by the RIU 209, 210 and required to be sourced by the network control facility 205 during time periods in which the network control facility 205 provides power to the RIUs 209, 210. To facilitate controlled enablement and disablement of the primary downstream channel receiving and processing circuitry 403, 407, the communication system of the present invention includes a secondary, low speed downstream channel 213 which is used as a control channel to communicate commands to the RIU 209, 210 instructing the RIU 209, 210 to enable and optionally disable at least the RIU's primary downstream channel receiving and processing circuitry 403, 407.

In accordance with the present invention, the RIU 209, 210 provides two primary functions with respect to telephony services: call reception and call initiation. In the case of call reception, the network control facility 205 receives information packets from the external network 203 which are destined for a particular RIU 209 (e.g., which include the EP address of the RIU 209). Responsive to receiving the packets, the network control facility 205 transmits control information (e.g., a wake-up command) to the target RIU 209 via the low speed, secondary downstream channel 213 instructing the RIU 209 to transition from low power standby mode, to active mode. The control information preferably includes an identification code or address of the RIU 209 to enable the RIU 209 to distinguish its control information from control information intended for another RIU 210, and might further include a time duration for which the RIU 209 is to remain in the active mode (e.g., the time duration of the call, such as when a call is being delivered automatically from a voice mail server), a schedule of future wake-up times for the RIU 209 to receive periodic system maintenance information, or other commands as described in more detail below.

Responsive to receiving the control information via the RIU's secondary downstream channel receiver/demodulator 405, the RIU's standby mode processor 409 enables power to the RIU's active mode processor 407, primary downstream channel receiver demodulator 403, and upstream channel modulator/transmitter 401. Alternatively, the standby mode processor 409 might enable power only to the active mode processor 407, which in turn would then enable power to the primary downstream channel receiver demodulator 403 and the upstream channel modulator/transmitter 401.

Upon completion of the power-up or mode transition sequence, the RIU 209 transmits an acknowledgment message confirming receipt of the control information to the network control facility 205 over the upstream channel 215 and begins receiving and processing information packets communicated over the high speed, primary downstream channel 212. After the call has been completed, the RIU 209 returns to its low power, standby mode either automatically or responsive to receipt of a power-down command from the network control facility 205. To transition the RIU 209 from active mode to standby mode, the standby mode processor 409 disables power to the RIU's active mode processor 407, primary downstream channel receiver demodulator 403, and upstream channel modulator/transmitter 401, and returns to just monitoring transmissions over the secondary downstream channel 213. Alternatively, the standby mode processor 409 might first instruct the active mode processor 407 to disable power to the primary downstream channel receiver demodulator 403 and the upstream channel modulator/transmitter 401, and then, after expiration of a period of time necessary to accomplish such disabling, disable power to the active mode processor 407.

To initiate a call, the RIU standby mode processor 409 continually detects for receipt of an indication (e.g., off-hook tone or signal) from the communication device interface 411 of a desire to communicate. (e.g., make an outgoing call). Upon detecting such an indication, the standby mode processor 409 enables power to the active mode processor 407, the primary downstream channel receiver demodulator 403 and the upstream channel modulator/transmitter 401 as described above, and proceeds to service the call. After the call has been completed, the RIU 209 disables power to the active mode processor 407, the primary downstream channel receiver demodulator 403, and the upstream channel modulator/transmitter 401, and returns to operation in low power, standby mode.

In a preferred embodiment, the processing power required (and accordingly the power consumed) for the RIU 209, 210 to operate in standby mode is minimal (e.g., less than 3 watts in one embodiment), necessitating only enough power to support a limited command set protocol for providing certain basic RIU functions. The limited command set preferably includes the following four commands, although other commands may be added so long as the power consumed by the RIU 209, 210 to process the commands in standby mode remains below a desired threshold (e.g., about 3 watts): 1) a power-down command, 2) a power-up or wake-up command, 3) a self-test or maintenance command, and (4) an update configuration parameters command. All four commands are generated by the network control facility 205 and communicated to the RIU 209, 210 over the secondary downstream channel 213.

Responsive to receiving a power-down command, the standby processor 409 preferably disables power from all components 401, 403, 407 within the RIU 209 which are essential for using the primary downstream and upstream channels 212, 215, but maintains power and service to the secondary downstream channel receiver/demodulator 405, the timing reference 413, the standby mode processor 409, and the external device interface 411. Responsive to receiving a power-up or wake-up command, the standby mode processor 409 enables power to be applied to the upstream channel and primary downstream channel components 401, 403, 407 of the RIU 209, 210 which are not presently powered. The wake-up command might instruct the standby mode processor 409 to wake-up or power-up the dormant RIU components 401, 403, 407 at some specified time in the future (e.g., to support maintenance service for the RIU 209, 210) or might instruct the standby mode processor 409 to initiate the power-up sequence immediately.

The self-test or maintenance command provides a mechanism through which the network control facility 205 can schedule a desired time for the RIU 209, 210 to power-up and process a low priority activity, such as a DOCSIS station maintenance or ranging event or an RIU timing update to relock the time reference 413. The update configuration parameters command provides a mechanism through which the network control facility 205 can update the configuration parameters (e.g., primary downstream channel center frequency, upstream channel center frequency, or upstream channel modulation type) of the active mode components 401, 403, 407, without requiring the active mode processor 407 to be powered on. Responsive to receiving an update configuration parameters command, the standby mode processor 409 stores the new parameters in memory until the next active mode power-up cycle. After the active mode components 401, 403, 407 have been powered up, the standby mode processor 409 downloads the new update parameters into the memory of the affected components 401, 403, 407. The four command set described above provides a basis for a preferred minimal protocol utilizing the secondary downstream channel 213; however, other commands could be added provided that a threshold standby mode processing power was not exceeded, and inclusion of such other commands would be considered to fall within the spirit and scope of the present invention.

In addition, the above description has focused primarily on servicing telephone calls either received or initiated by the RIU 209, 210. However, the present invention is also applicable to other services supported by the communication system. For example, the process of providing data or video services would parallel that of providing telephony services with the exception that a data or video packet, rather than a telephone call, would be received by the network control facility 205. In the context of VoIP, voice and data are the same (i.e., binary data packets), with the exception that telephony packets require a higher quality of service (e.g., less delay) than traditional data packets. In addition, data does have the additional complexity that it does not have a "call state" establishment procedure. Therefore, some other wake up mechanism, (such as the presence or absence of a data packet in a certain time period, use of buffers, busy period trends, or an extended protocol function), would have to be utilized to stimulate power mode changes to save overall cable plant average power.

The preferred processes for supporting a low power, standby mode for the RIU 209, 210 are divided into three process states: a boot-up state, a standby mode processing state, and an active mode processing state. When the RIU 209, 210 is in the boot-up state, the RIU 209, 210 powers up (e.g., responsive to the user flipping the power switch to the "ON" state), performs self-diagnostic tests, and registers with the network control facility 205 over the upstream channel 215 and primary downstream 212. The particular steps executed by the active mode processor 407 to register the RIU 209, 210 in the system depend upon the type of protocol being executed in the system by the system provider, but such steps are generally known and include, for a DOCSIS-based system, obtaining an address configuration, obtaining a physical layer communications configuration (e.g., upstream and downstream channel center frequencies), and obtaining software updates from the network control facility 205. These three steps (powering-on, performing self-diagnostics testing, and registering) are identical to processes utilized by prior art cable modems which do not support a low power, standby mode. In contrast to such prior art cable modems, the RIUs 209, 210 of the present invention also receive configuration parameters (e.g., center frequency, modulation, and upstream transmit power level) for the secondary downstream channel 213 during the boot-up state.

After the RIU 209, 210 has completed its boot-up processing, the RIU 209, 210 enters the standby mode processing state. In this state, the standby mode processor 409 monitors the secondary downstream channel for a command from the aforementioned limited command set. If no new command is detected, the processor 409 monitors the condition of the local interface 411 to determine if service is needed (e.g., whether the subscriber communication device 201, 202 is attempting to initiate a call or data transmission). If the local interface 411 requires service, the standby mode processor 409 powers up the active mode processor 407 and the other active mode components 401, 403. If a command addressed to the RIU 209, 210 is received over the low transmission rate, secondary downstream channel 213, the processor 409 compares the received command to the commands in the limited command set and executes the command if it is one of the commands in the set.

After the standby mode processor 409 enables power to the active mode components 401, 403, 407, the RIU 209, 210 enters the active mode processing state. In this state, the RIU 209, 210, when implemented as a cable modem, functions in a manner similar to a conventional cable modem, providing service to the high transmission rate, primary downstream channel 212 and the upstream channel 215. The secondary downstream channel monitoring performed by the standby mode processor 409 may be disabled during active mode or may be executed in parallel providing additional downstream bandwidth or configuration control. For example, because the secondary downstream channel 213 uses a lower order modulation scheme than does the primary downstream channel 212, the secondary downstream channel 213 is more robust and can tolerate a much higher level of noise without corruption of information packets than can the primary downstream channel 212. One of ordinary skill in the telecommunications art will appreciate that use of a robust secondary downstream control channel 212 provides significant advantages in the provision of high quality communication services.

Up to this juncture, the detailed description has focused primarily on how an RIU 209, 210 receiving power from the network control facility 205 via the distribution network 207 could be generally implemented and operated to substantially reduce the average power consumed by the RIU 209, 210. However, implementing the present invention in certain systems poses additional difficulty due to the particular standards or system operating criteria upon which the systems are based. One such set of criteria that renders the implementation of the present invention difficult is the use of TDMA as the protocol for accessing the upstream channel 215. One popular standard in the two-way cable industry that employs such a TDMA upstream channel access protocol is the DOCSIS Version 1.0 standard. The DOCSIS standard does not provide any mechanism for supporting a low power, standby mode of operation for a cable modem.

When a cable system or other communication system is implemented and operated in accordance with the DOCSIS standard or any other standard requiring TDMA upstream channel access, time synchronization between the RIU 209, 201 and the network control facility (e.g., cable system headend or cable modem termination station (CMTS)) is critical to proper transmission and reception of information without incurring undesired delays. Such synchronization is particularly critical in telephony systems where real-time delays are most noticeable by the system subscriber. If the active mode processor 407 is disabled for a period of time, the RIU 209, 210 may be unable to maintain time synchronization (e.g., via the software-based phase locked loop timing reference 413) with the network control facility 205 and, therefore, may not be permitted to transmit over the upstream channel 215 pursuant to the DOCSIS or other standard. Cable modem/CMTS synchronization is typically maintained through the transmission of time stamp messages from the CMTS to the cable modem over the primary downstream channel 212. In the standby mode, the RIU 209, 210, when implemented as a cable modem, would not receive the time stamp messages, resulting in the loss of synchronization.

Further, telephone service industry guidelines for call back acknowledgment response times require that the cable modem must be able to acknowledge a call request from the CMTS in less than two hundred (200) milliseconds. Typically, in addition to powering up, a cable modem would be required to receive and process multiple time stamp messages to re-synchronize to the required accuracy before transmitting an upstream acknowledgment. If, during the power-up sequence, the cable modem must wait for three time stamp messages (which is a reasonable lower limit on the number required) to re-synchronize, an additional two hundred twenty-five (225) milliseconds would likely be added to the acknowledgment response time. Thus, the cable modem could not re-synchronize in time to timely respond to the incoming call. Further, while the CMTS could accelerate the rate of time stamp messages during the wake-up period, such increased rate would likely only provide minimal improvement in response time as the duration between time stamp messages also contributes to additional accuracy.

To implement the present invention in a cable or other system operating in accordance with the DOCSIS standard, the upstream time slot definitions for certain upstream transmission types are preferably varied on a temporary basis to enable the RIU 209, 210 (e.g., cable modem) to acknowledge a call within the specified 200-millisecond window, without requiring complete re-synchronization with the network control facility 205. The DOCSIS standard specifies the time slot configurations for a number of different upstream transmission types, including an initial ranging response, a periodic ranging response, an upstream bandwidth request, short data, and long data. The time slot parameters associated with these different transmission types, including the guard times surrounding a transmission burst are reconfigurable or variable. However, with the exception of the initial ranging transmission type, the guard times are intended to be minimal with the goal of maximizing data efficiency.

Two techniques may be utilized to wake-up an RIU 209, 210 in standby mode and allow it to acknowledge the wake-up command within the time period required by the DOCSIS standard. In accordance with the first and preferred technique, the network control facility 205 opens up or increases the guard times of the TDMA time slot in which the RIU 209, 210 is to respond to or acknowledge the wake-up command and communicates the identity of the allocated response time slot to the RIU 209, 210 as part of the control information conveyed over the secondary downstream channel 213. In the preferred embodiment, the wake-up command and acknowledgment time slot allocation embodied in a periodic "ranging" or "station maintenance" message as specified in the DOCSIS standard. The periodic ranging or station maintenance messages are typically used in DOCSIS to update and/or maintain transmission characteristics unique to each cable modem including its timing accuracy. Consequently, periodic ranging messages are typically unicast (addressed) to a particular cable modem.

Figure 5:
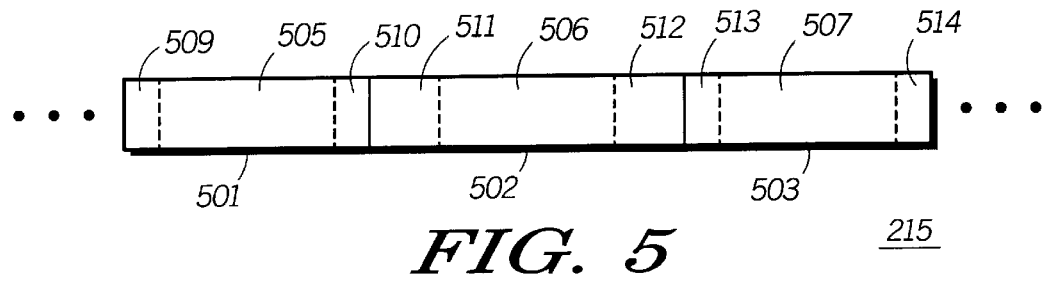
FIG. 5 is an exemplary timing diagram of the upstream channel of the communication system of FIG. 2 illustrating enlarged time slot guard time periods to facilitate a remote interface unit's acknowledgment response to a wake-up command in accordance with a preferred embodiment of the present invention.

FIG. 5 is an exemplary timing diagram of an upstream channel 215 employing TDMA access, such as in accordance with the DOCSIS standard, and illustrating enlarged time slot guard time periods 511, 512 to facilitate an RIU response to a wake-up command in accordance with a preferred embodiment of the present invention. As shown, the upstream channel 215 is divided into a plurality of time slots 501–503, each including a respective fixed time period portion 505–507 which is immediately preceded by and succeeded by a respective guard time 509–514. The pair of guard times 511, 512 surrounding the fixed time period portion 506 in which the wake-up command acknowledgment is to be transmitted are depicted in FIG. 5 as being larger than their counterparts in the other time slots 501, 503. Thus, each pair of guard times 511, 512 of a time slot 502 in which a wake-up command acknowledgment is to be communicated constitutes a variable time period portion of the time slot 502 which may be varied during the RIU's transition from standby mode to active mode to enable the RIU to timely respond to the wake-up command. Either or both of the guard times 511, 512 may be varied by the network control facility 205 in accordance with the present invention to facilitate transmission of a call acknowledgment from the RIU 209, 210 to the network control facility 205.

The RIU's response to the periodic ranging or station maintenance message serves as the response to the wake-up command. The RIU 209, 210 then completes its re-synchronization with the network control facility 205 (which may take a few hundred milliseconds) and transmits a status message to the network control facility 205 at an appropriate time (e.g., responsive to receipt of another periodic ranging message) to inform the network control facility 205 that time-synchronization has been established. Once the RIU 209, 210 is time-synchronized with the network control facility 205, the network control facility can "retighten" or decrease the associated guard times 511, 512 associated with the ranging response time slots 502, and resume ranging parameter updates.

An alternative approach to communicating the wake-up command to the RIU 209, 210 is to utilize a unicast initial ranging message to the particular RIU 209, 210. The initial ranging burst type was intended to be used in a DOCSIS cable system when a cable modem was first joining the network and parameter adjustments unique to the cable modem, such as timing, had not yet been determined. This initial ranging burst type allows the RIU 209, 210 to transmit an upstream ranging response burst with a significant amount of guard, time around the burst, therefore eliminating the possibility of corrupting the transmission of another RIU 209, 210 by having the responding RIU's transmission spill partially or completely over into an adjacent TDMA time slot. Under the DOCSIS standard, initial ranging messages are broadcast to all cable modems. However, the DOCSIS standard does not prohibit the unicast transmission of such initial ranging messages. Therefore, while the DOCSIS standard did not intend for the CMTS to issue unicast initial ranging messages, their use is not incompatible with the DOCSIS standard and would allow the RIU 209, 210 identified in the message to receive the wake-up command, transition to active mode, and transmit an upstream acknowledgment without negatively impacting system performance.

To illustrate a preferred implementation of the present invention within a DOCSIS environment, consider the following example. The network control facility 205 (e.g., CMTS) receives a call from the external network 203 which is addressed for an RIU 209, 210 that is currently in low-power mode. The network control facility 205 then communicates control information containing a wake-up command to the targeted RIU 209, 210 on the low speed, secondary downstream channel 213. The control information also includes the time-slot 502 (preferably between one hundred fifty and two hundred milliseconds in the future) in which the RIU 209, 210 should respond with an acknowledgment of receipt of the control information. The acknowledgment may take the form of a simple DOCSIS station maintenance response or a unique command addressed to the network control facility 205.

Prior to the RIU's response, the network control facility 205 expands the guard times 511, 512 surrounding the targeted RIU's response time slot 502 and waits for the acknowledgment. Since the RIU 209, 210 has been in low power mode, the RIU's internal timing reference 413 required to support the TDMA timing has been free running and may have drifted in time with respect to the timing reference 305 of the network control facility 205. To account for the potential drift in timing, the network control facility 205 preferably expands the guard times 511, 512 surrounding the time slot 502 allocated for transmission of the acknowledgment, thereby accommodating such drift. The DOCSIS specification allows for as much as 255 symbols of guard time, which is 98.84 microseconds for the worst-case highest symbol rate, 2.56 Mbaud. Further the specification allows for a maximum crystal inaccuracy (which is the primary cause for timing reference drift) of +−55 ppm (+−5 ppm for the headend and +−50 ppm for the cable modem) or 10.74 microseconds. The system may therefore compensate for up to 9.2 seconds (98.84/10.74) of drift using the expanded guard time process.

If the system were allowed to free run for longer than 9 seconds, then the guard time increases described above may not be sufficient to fully account for the RIU's timing drift. Therefore, the network control facility 205 preferably maintains a timer for each RIU 209, 210 and transmits a wake-up command to any RIU 209, 210 that has been in standby mode for more than a threshold period of time to allow such RIU 209, 210 to re-synchronize its timing reference 413. In a preferred embodiment, the timing re-synchronization wake-up interval is approximately eight seconds with a wake up duration of 500 milliseconds (two hundred (200) milliseconds for a power-up sequence and three hundred (300) milliseconds to correct the RIU's timing accuracy). Note, that within a DOCSIS system, this resynchronization wake-up interval could piggy-back the existing station maintenance process by assuring that this process happens within every eight seconds to low power cable modems 105.

Notwithstanding the present invention's increases of upstream channel time slot guard times 511, 512 to attempt to accommodate for drift in the timing reference 413 of the RIU 209, 210, an alternate approach for accommodating timing drift which may be used in conjunction with or instead of the increase in guard time is to more accurately measure and compensate for the differences in the crystal timing references between the network control facility 205 and the timing reference 413. This does not require any additional hardware but may actually be accomplished by modifications to reference tracking algorithms in an active network.

Crystal accuracies are determined by two primary factors: 1) core accuracy as determined by the crystal and manufacturing process, and 2) temporal drift which is primarily a function of temperature. By assuming that temperature remains relatively constant for the time durations considered here (less than 50 seconds), then the only factor to consider is the core crystal accuracy. If one were to take two "equivalent" crystals which were sold as 10.24 MHz crystals, and measure their output, one might see 10,240,003 Hz and 10,239,997 Hz. However, common to most synchronous communication systems, it is not the absolute accuracy which is an issue, but the relative accuracy between the two clocks, which in this case is different by 6 Hz (10,240,003−10,239,997). If this error is known and remains fairly constant, which it will under consistent temperatures, then the communications system can compensate for it. The system may determine the value of this error by measuring differences over extended periods (such as several seconds or minutes). In the above example, with a clock difference of 6 Hz, the system could detect differences of 60 clock cycles over a 10-second interval. Therefore, the system can detect clock differences to an accuracy of 1/T of the crystal period where T is the measurement interval in seconds. The cable modem may then compensate for this difference by applying a factor which relates the cable modem clocks to headend clocks. The DOCSIS specification allows for inaccuracies of +−1.5 symbols (+−0.5 symbol allocated to the headend equipment 101 and +−1 symbols allocated to the cable modem 105) on upstream TDMA transmissions. The most stringent requirement occurs for the highest DOCSIS upstream symbol rate (or shortest symbol period) which is 2.56 Mbaud and results in a timing inaccuracy tolerance of 585.9 nanoseconds (1.5/2,560,000). Utilizing the DOCSIS crystal requirement of 10.24 MHz and a measurement interval (T) of 10 seconds, the system has an accuracy of 1/10 of the clock period or 1/10*(1/10,240,000) or 9.766 nanoseconds for which the system could not compensate. However, the system could freerun for nearly 60 seconds (585.9/9.766) before the uncompensated drift will have exceeded the DOCSIS specification. Since the DOCSIS specification requires the cable modems 105 to perform station maintenance at least once every 30 seconds, and commonly performed every 20 seconds, a measurement interval of 10 seconds will more than compensate for a possible low power modem interval in between station maintenance activity.

Upon receiving the wake-up command, the RIU 209, 210 enables power to the active mode processor 407, the primary downstream channel receiver/demodulator 403, the upstream modulator/transmitter 401, and any other supporting circuitry necessary for the RIU 209, 210 to execute the upstream and primary downstream channel protocols, and initiates the process of acquiring timing synchronization with the network control facility 205. Realizing that the RIU 209, 210 needs to acknowledge the wake-up command, the headend upstream bandwidth scheduler may proceed to grant a upstream time slot when the RIU 209, 210 will acknowledge the command. This upstream time slot may be included with the wake-up command. At the time specified in the wake-up command, the RIU 209, 210 transmits the acknowledgment to the network control facility 205 indicating receipt of the wake-up command. The network control facility 205 receives the acknowledgment and proceeds to process the call via the primary downstream channel 212 and the upstream channel still using the expanded guard times for any upstream transmissions from the RIU 209, 210. During the timing resynchronization time period (typically less than three hundred (300) milliseconds), the network control facility 205 (e.g., CMTS) does not process any ranging parameter updates for the re-synchronizing RIU 209, 210 because any upstream transmission bursts from the RIU 209, 210 are expected to be slightly misaligned.

When the RIU 209, 210 has completed its timing re-synchronization, the RIU 209, 210 preferably transmits an upstream status message back to the network control facility 205 indicating that the RIU 209, 210 has become time-synchronized with the network control facility 205. Responsive to the status message, the network control facility 205 decreases or retightens the guard times for time slots containing subsequent upstream transmissions from the RIU 209, 210 to their original values (e.g., 3 to 50 microseconds depending upon the upstream symbol rate ranging from 160 kbaud to 2560 kbaud) and continues processing the call. Alternately, since timing resynchronization is expected to be completed fairly quickly (e.g., preferably in less than three hundred (300) milliseconds), transmission of the synchronization status message may not be necessary. Instead, the network control facility 205 may set a timer to a predetermined period of time (e.g., four hundred (400) milliseconds) and, upon expiration of the predetermined time period, automatically decrease or retighten the guard times for time slots containing subsequent upstream transmissions from the RIU 209, 210.

To summarize, the present invention provides a communication system in which a low power, low speed out-of-band downstream channel 213 (out-of-band with respect to the primary downstream channel 212) is used by the network control facility 205 to wake up an RIU 209, 210 presently operating in standby mode when the network control facility 205 detects that a message (voice call, data, and/or video) must be directed to the RIU 209, 210. The out-of-band downstream channel 213 is monitored by a minimal protocol engine operating in the RIU 209, 210 when the RIU is in standby mode to detect for the presence of a wake-up command or other equivalent control information. When such a command is received by the RIU 209, 210, the primary downstream channel receiver and demodulation functions (along with other elements as appropriate) are activated within the RIU 209, 210 to transition the RIU 209, 210 from standby mode to active mode. While such activation would be typically invoked by the network control facility 205 due to the network control facility's receipt of an impending message for a user of a communication device 201, 202 coupled to the RIU 209, 210, such activation may also be invoked to convey control messages to the RIU 209, 210. Such control messages may include scheduled wake-up times for the RIU 209, 210 to perform basic maintenance functions required of an RIU 209, 210 in the system. The wake-up command may also include information on the duration of the wake up or the duration that the RIU 209, 210 should remain in standby mode after transitioning to standby mode.

The present invention provides not only for arousal of the RIU 209, 210 by the network control facility 205, but also for the RIU 209, 210 to awake itself in the event that the RIU 209, 210 detects that a communication device 201, 202 coupled to the RIU 209, 210 desires to initiate a communication in the system (e.g., through receipt of an off hook signal or protocol-based message from the communication device 201, 202). The present invention further provides preferred procedures to implement the dual-mode RIU 209, 210 in a two-way cable system that utilizes the DOCSIS standard without introducing undesirable delays during the RIU's transition from standby mode to active mode.

Figure 6:
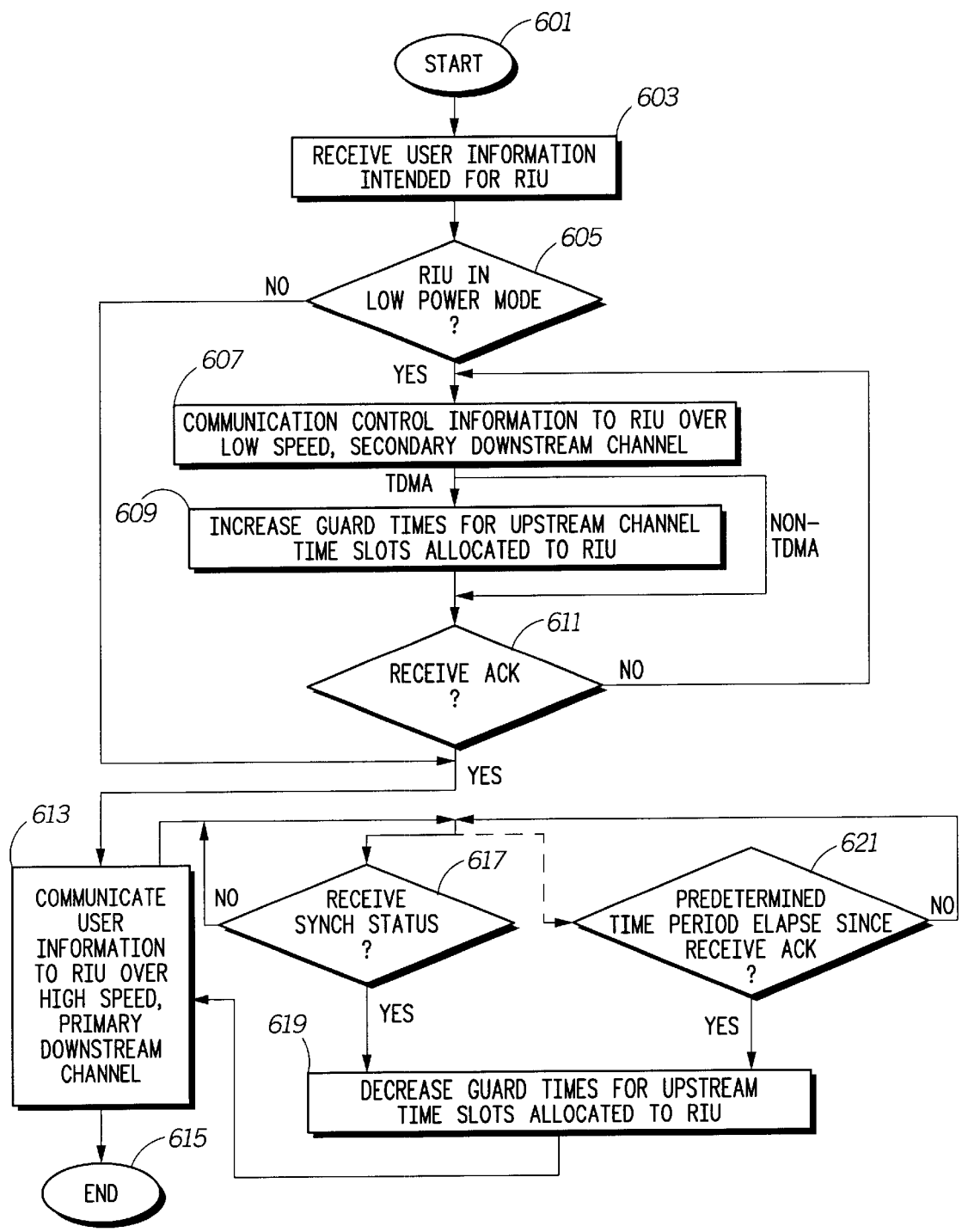
FIG. 6 is a logic flow diagram of steps executed by a network control facility to wake-up a remote interface unit that is in standby mode in accordance with the present invention.

FIG. 6 is a logic flow diagram 600 of steps executed by a network control facility to wake-up a remote interface unit (RIU) that is in standby mode in accordance with the present invention. The logic flow begins (601) when the network control facility receives (603) user information intended for the remote interface unit. For example, the network control facility might receive an information packet (voice, data or video) that includes an IP address of the RIU. After receiving the user information, the network control facility determines (605) whether the RIU is in the low power, standby mode. If the RIU is in the low power mode (e.g., not presently engaged or participating in a communication), the network control facility communicates (607) control information to the RIU over the low speed, secondary downstream channel. The control information preferably includes a command (e.g., wake-up command) instructing the RIU to transition from the low power, standby mode to the active mode and to begin monitoring the primary downstream channel for user information.

The control information might further include the duration of time during which the RIU should remain in the active mode to complete the communication containing the user information or should remain in the standby or low power mode after completion of the communication containing the user information. The control information may further include a schedule of upcoming wake-up times for transitioning from low power mode to active mode to receive and perform basic maintenance functions, such as timing re-synchronization, receiving configuration or parameter updates. In the event that the network control facility and the remainder of the communication system utilize the protocols defined in the DOCSIS standard or another TDMA protocol over the upstream channel, the control information also preferably includes an identification of the upstream channel time slot in which the RIU is to acknowledge receipt of the control information.

After communicating the control information to the RIU, the network control facility either increases (609) the guard times for the upstream channel time slots allocated for RIU transmissions and monitors (611) the upstream channel for a wake-up command acknowledgment (ACK) in an allocated time slot (e.g., when TDMA is employed as the upstream channel access protocol), or monitors (611) the upstream channel for a wake-up command acknowledgment from the RIU (e.g., when a time-independent protocol is used as the upstream channel access protocol). If the network control facility does not detect the acknowledgment in its allocated time slot or within a predetermined period of time (e.g., 300 milliseconds), the network control facility must re-transmit the control information.

In the event that the network control facility has received an acknowledgment from the RIU or the RIU was determined to be in its high power, active mode in step 605, the network control facility communicates (613) user information packets to the RIU over the high speed, primary downstream channel and, if applicable, receives user information packets from the RIU over the upstream channel (i.e., processes the communication), and the logic flow ends (615). The user information packets communicated to the RIU over the primary downstream channel preferably include an identification code or address of the RIU to enable the RIU to distinguish its user information packets from other information packets communicated over the primary downstream channel. Additionally, when a TDMA protocol is used over the upstream channel, the network control facility preferably maintains increased guard times for upstream time slots allocated to the RIU until the RIU has re-acquired time synchronization with the network control facility.

In the event that the upstream channel utilizes the DOCSIS-defined protocol or some other TDMA protocol, the network control facility must determine whether the RIU has achieved synchronization. While communications over the high-speed primary downstream and upstream channel will occur prior to synchronization, the expansion of the guard time does not result in optimal use of the upstream channel. Two different options may be used to determine if synchronization is achieved. First, the network control facility may determine whether it has received a synchronization status message (note that this is not a requirement of the DOCSIS standard but consistent with it) from the RIU (617). The synchronization status message is sent by the RIU to indicate that its internal timing reference is in synchronization with the internal timing reference of the network control facility. To enable the RIU to acquire synchronization with the network control facility, the network control facility transmits time-stamped control messages on a regular basis over the primary downstream channel to enable the RIU to compare its internal time reference with the time stamp of the control message (typically referred to as DOCSIS Time Synchronization or SYNC message in accordance with the DOCSIS standard).

When the network control facility has received a synchronization status message from the RIU indicating that the internal time reference of the RIU is in synchronization with the time reference of the network control facility, the network control facility decreases (619) or retightens the guard times to their nominal values for future upstream time slots allocated to the RIU.

Alternatively (as shown by the dashed lines in FIG. 6), the network control facility may determine if synchronization has been achieved by determining whether a predetermined time period has elapsed since the network control facility received the wake-up command acknowledgment (621). When such a predetermined time period has elapsed, the network control facility presumes that synchronization has been obtained and proceeds with decreasing the upstream time slot guard times as described above with respect to step 619. If the predetermined time period has not elapsed, the network control facility continues by utilizing the expanded guard time for upstream transmission until such time has passed.

Figure 7:
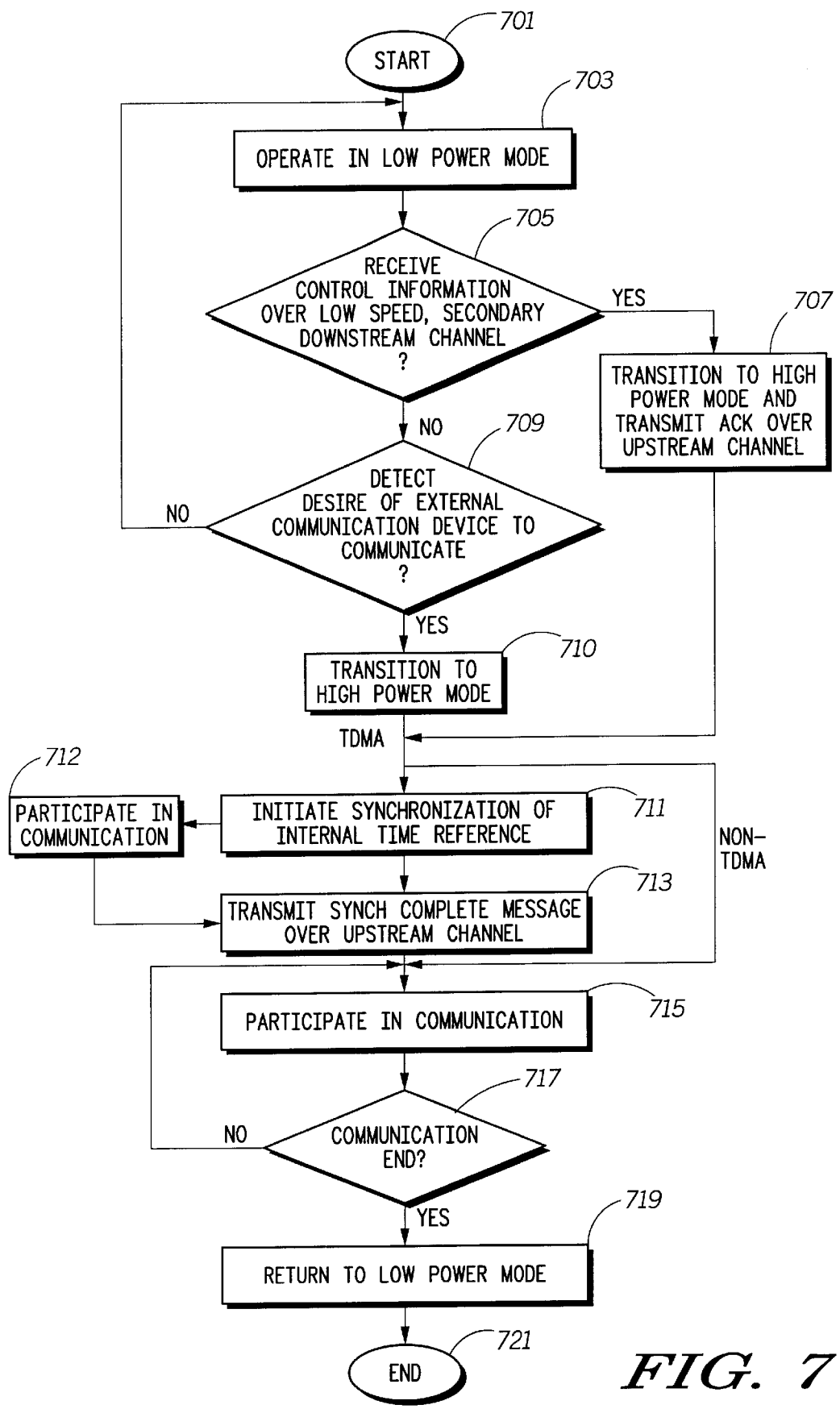
FIG. 7 is a logic flow diagram of steps executed by a remote interface unit to transition from standby mode to active mode in accordance with the present invention.

FIG. 7 is a logic flow diagram 700 of steps executed by a remote interface unit (RIU) to transition from standby mode to active mode in accordance with the present invention. The logic flow begins (701) when the RIU operates (703) in low power, standby mode. The low power mode is used by the RIU preferably at times when the RIU is not actively involved in a two-way communication, or has not been scheduled to receive maintenance messages and perform maintenance functions. While in low power mode, the RIU determines (705) whether it has received control information from the network control facility over the low speed, secondary downstream channel. If the RIU has received such control information, the RIU transitions (707) to high power mode and transmits an acknowledgment (ACK) of receipt of such control information over the upstream channel.

If no such control information has been received, the RIU determines (709) whether it has detected any indication of whether an external communication device coupled to the RIU desires to communicate in the system. For example, when the external communication device comprises a standard telephone, the RIU might determine that the telephone desires to place a call by the presence of an off hook signal emanating from the telephone. If an off hook signal is detected, then the RIU transitions to the high power mode (710).

After the RIU has either detected a desire of the external communication device to communicate or transmitted its acknowledgment of receipt of the control information, subsequent RIU operation follows one of two process paths depending on whether or not a TDMA access protocol is used over the upstream channel. When a TDMA access scheme is used over the upstream channel (e.g., as defined in the DOCSIS standard), the RIU initiates synchronization (711) of its internal time reference with the time reference of the network control facility responsive to receipt of time-stamped messages from the network control facility. While synchronizing, the RIU will begin communication with the network control facility with the expanded guard intervals (712). Optionally, the RIU transmits (713) a synchronization status message over the upstream channel to the network control facility to inform the network control facility that synchronization has been obtained. After time synchronization has been obtained, the RIU participates (715) in the communication in accordance with conventional techniques (e.g., as defined in the DOCSIS standard), receiving information packets over the primary downstream channel and transmitting information packets over the upstream channel.

When a TDMA access scheme is not used over the upstream channel, the RIU does not perform timing synchronization and simply participates (715) in the communication that was either initiated by the network control facility or by an external communication device coupled to the RIU, receiving information packets over the primary downstream channel and conveying information packets over the upstream channel. When the RIU determines (717) that the communication has ended, the RIU returns (719) to low power mode, either automatically or responsive to receipt of a power-down command from the network control facility, and the logic flow ends (721). Thus, the RIU operates in high power mode only while it is active in a communication, such as a communication with another RIU via the network control facility or a communication (e.g., receipt and acknowledgment of updated configuration parameters) with the network control facility itself. At all other times, the RIU is preferably in low power mode, thereby substantially reducing its average power consumption and likewise reducing the power sourcing requirements of the network control facility when the network control facility supplies the power to the RIU.

The present invention encompasses a communication system and method of operation that reduces power-sourcing requirements of the system infrastructure when the system infrastructure is required to provide such power to the system RIUs, without degrading system performance. With this invention, a low speed, secondary downstream channel is used to turn on the high power consuming components (e.g., high speed downstream channel receiving and processing components) of an RIU only when such components are necessary to participate in a communication, thereby substantially reducing the average amount of power consumed by the RIU in contrast to prior art cable modems which maintain power to the high speed, downstream channel receiving and processing components at all times. Such a reduction in average power consumed by each RIU of the system facilitates the use of a much lower cost system infrastructure due to the infrastructure's reduced power sourcing requirements. In addition, when TDMA is used as the upstream channel access scheme, the present invention provides for the expansion of upstream channel time slot guard times for particular types of RIU transmissions during the time period when the newly-awoken RIU is re-synchronizing to mitigate RIU response delays and facilitates a quality of service necessary to support VoIP telephony services.

While the foregoing constitute certain preferred and alternative embodiments of the present invention, it is to be understood that the invention is not limited thereto and that in light of the present disclosure, various other embodiments will be apparent to persons skilled in the art. Accordingly, it is to be recognized that changes can be made without departing from the scope of the invention as particularly pointed out and distinctly claimed in the appended claims which shall be construed to encompass all legal equivalents thereof.

Benefits, other advantages, and solutions to problems have been described above with regard to specific embodiments of the present invention. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof are intended to refer to a non-exclusive inclusion, such that a process, method, article, or apparatus that comprises a list of elements does not include only those elements, but may include other elements not expressly listed or inherent to such process, method, article, or apparatus.

What is claimed is:

1. A communication system comprising:
    a remote interface unit that operates in accordance with a first downstream communication protocol when the remote interface unit is in a first mode of operation and operates in accordance with a second downstream communication protocol when the remote interface unit is in a second mode of operation, the first mode of operation consuming substantially less power than the second mode of operation;
    a network control facility that controls communications involving the remote interface unit and routes information to and from the remote interface unit;
    a first downstream channel for communicating control information from the network control facility to the remote interface unit in accordance with the first downstream communication protocol when the remote interface unit is in the first mode of operation, the first downstream channel operating at a first transmission rate, the control information at least instructing the remote interface unit to transition from the first mode of operation to the second mode of operation; and
    a second downstream channel for communicating user information from the network control facility to the remote interface unit in accordance with the second downstream communication protocol when the remote interface unit is in the second mode of operation, the second downstream channel operating at a second transmission rate that is greater than the first transmission rate,
    the first and second downstream channels responsive to establish access by the remote interface unit to the network control facility via a time division multiple access channel shared concurrently by a plurality of remote interface units.

2. The communication system of claim 1, wherein the first transmission rate comprises a rate resulting from applying one of frequency shift keying (FSK), quaternary phase shift keying (QPSK) and quadrature amplitude modulation (QAM) to the control information to be communicated over the first downstream channel.

3. The communication system of claim 2, wherein the second transmission rate comprises a rate higher than the first transmission rate communicated over the second downstream channel.

4. The communication system of claim 1, wherein the remote interface unit comprises:
    a first receiver operably coupled to receive the user information communicated over the second downstream channel when the remote interface unit is in the second mode of operation;
    a second receiver operably coupled to receive the control information communicated over the first downstream channel when the remote interface unit is in the first mode of operation;
    a first processor operably coupled to the first receiver, the first processor processing the user information received by the first receiver when the remote interface unit is in the second mode of operation; and
    a second processor operably coupled to at least the second receiver and the first processor, the second processor processing the control information received by the second receiver when the remote interface unit is in the first mode of operation and enabling at least the first processor responsive to the control information to transition the remote interface unit from the first mode of operation to the second mode of operation.

5. The communication system of claim 1, wherein the first mode of operation is a standby mode of operation and wherein the second mode of operation is an active mode of operation.

6. The communication system of claim 1, wherein the network control facility comprises headend equipment of a two-way hybrid fiber coaxial cable system.

7. The communication system of claim 1, wherein the communication system further includes an upstream channel for communicating information from the remote interface unit to the network control facility in accordance with an upstream communication protocol and wherein the network control facility receives information packets from an external network for delivery to the remote interface unit, the network control facility comprising:
    an external network interface for receiving at least one information packet intended for the remote interface unit;
    a first transmitter, operably coupled to the external network interface, the first transmitter transmitting the control information over the first downstream channel responsive to receiving at least one information packet;
    an upstream channel receiver operably coupled to receive an acknowledgment packet from the remote interface unit over the upstream channel responsive to transmission of the control information; and
    a second transmitter, operably coupled to the external network interface, the second transmitter transmitting at least one information packet over the second downstream channel responsive to receipt of the acknowledgment packet.

8. The communication system of claim 1, wherein the user information communicated over the second downstream channel comprises at least one of audio information, video information, and data information.

9. A remote interface unit for use in a two-way communication system that includes a network control facility, the network control facility controlling communications involving the remote interface unit, the remote interface unit comprising:
    a first receiver for receiving control information from the network control facility over a first downstream channel when the remote unit is in a first mode of operation;
    a first processor operably coupled to the first receiver, the first processor processing the control information received by the first receiver when the remote unit is in the first mode of operation and enabling at least the first processor responsive to the control information to transition the remote interface unit from the first mode of operation to the second mode of operation;

a second receiver for receiving user information from the network control facility over a second downstream channel when the remote unit is in a second mode of operation, the second downstream channel operating at a transmission rate that is greater than a transmission rate of the first downstream channel and the second mode of operation consuming substantially more power than the first mode of operation; and a second processor operably coupled to the second receiver, the second processor processing the user information received by the second receiver when the remote unit is in the second mode of operation, the first and second processors responsive to establish, in the second mode of operation, access by the remote interface unit to the network control facility via a time division multiple access channel shared concurrently by a plurality of remote interface units.

10. The remote interface unit of claim 9, wherein the remote interface unit comprises a cable modem.

11. The remote interface unit of claim 9, further comprising an interface, operably coupled to at least the first processor and the second processor, for receiving information from an external communication device for communication to the network control facility over the upstream channel, wherein first processor may transition the remote interface unit from the first mode of operation to the second mode of operation responsive to detecting an indication that the external communication device desires to communicate information to the network control facility.

12. The remote interface unit of claim 11, wherein the interface comprises at least one of a telephone jack and/or a data port.

13. The remote interface unit of claim 11, wherein the indication that the external communication device desires to communicate information to the network control facility comprises an off-hook signal generated by the external communication device or a protocol signal or rule for non-telephony devices.

14. A two-way cable infrastructure system for communicating information to and receiving information from a remote interface unit, the two-way cable infrastructure system comprising:

headend equipment that controls communications involving the remote interface unit and routes information to and from the remote interface unit; and a cable plant supporting a first downstream channel for communicating control information from the headend equipment to the remote interface unit in accordance with a first downstream communication protocol when the remote interface unit is in a first mode of operation, a second downstream channel for communicating user information from the headend equipment to the remote interface unit in accordance with a second downstream communication protocol when the remote interface unit is in a second mode of operation, and a time division multiple access upstream channel shared concurrently by a plurality of remote interface units, for communicating user information from the remote interface unit to the headend equipment in accordance with an upstream communication protocol, the second downstream channel operating at a transmission rate that is greater than a transmission rate of the first downstream channel, the first mode of operation consuming substantially less power than the second mode of operation, the control information at least instructing the remote interface unit to transition from the first mode of operation to the second mode of operation to facilitate communication of the user information, and the fist and second downstream channels responsive to establish, in the second mode of operation, access by the remote interface unit to the network control facility via the upstream channel.

15. An improved two-way cable communication system that includes headend equipment, a plurality of cable modems, a shared downstream channel for communicating information from the headend equipment to the plurality of cable modems in accordance with a downstream communication protocol, and a time division multiple access upstream channel shared concurrently by the plurality of cable modems for communicating information from the plurality of cable modems to the headend equipment in accordance with an upstream communication protocol, wherein the improvement comprises:

a second downstream channel for communicating a command from the headend equipment to the plurality of cable modems, the command instructing at least one cable modem of the plurality of cable modems to begin executing the downstream communication protocol for the first downstream channel, the second downstream channel operating at a transmission rate that is substantially less than a transmission rate of the first downstream channel, the first and second downstream channels responsive to establish access by the at least one cable modem to the network control facility via the upstream channel.

16. A method for a network control facility to establish communication with a remote interface unit in a two-way communication system, the method comprising the steps of:

receiving user information intended for the remote interface unit;

determining whether the remote interface unit is in a first mode of operation;

communicating control information to the remote interface unit over a first downstream channel when the remote interface unit is in the first mode of operation, the control information instructing the remote interface unit to transition from the first mode of operation to a second mode of operation, the first mode of operation consuming substantially less power than the second mode of operation;

receiving an acknowledgment of receipt of the control information from the remote interface unit over a time division multiple access upstream channel shared concurrently by a plurality of remote interface units; and communicating the user information to the remote interface unit over a second downstream channel responsive to receipt of the acknowledgment, the second downstream channel operating at a higher transmission rate than the first downstream channel, the first and second downstream channels responsive to establish, in the second mode of operation, communication between the remote interface unit and the network control facility via the upstream channel.

17. The method of claim 16, wherein the control information includes an identification code associated with the remote interface unit.

18. The method of claim 16, wherein the control information indicates a duration of tune that the remote interface unit will be operating in the first mode of operation.

19. The method of claim 16, wherein the upstream channel utilizes a transmission protocol in which information is communicated in allocated time slots, wherein each time slot includes a fixed time period portion and a variable time period portion, and wherein the method further comprise the step of:

increasing the variable time period portion by a predetermined quantity of time to account for timing reference drift in the remote interface unit occurring while the remote interface unit was in the first mode of operation.

20. The method of claim 19, wherein the variable time period portion comprises a first guard time immediately preceding the fixed time period portion and a second guard time immediately succeeding the fixed time period portion.

21. The method of claim 19, wherein the control information includes an identification of a future time slot in which the remote interface unit is to communicate the acknowledgment over the upstream channel.

22. The method of claim 19, wherein the transmission protocol comprises the upstream transmission protocol specified in the Data-Over-Cable Service Interface Specification (DOCSIS).

23. The method of claim 22, wherein the acknowledgment comprises one of a DOCSIS periodic ranging and an initial ranging response message.

24. The method of claim 22, wherein the control information comprises one of a DOCSIS periodic ranging and an initial ranging response message.

25. The method of claim 19, further comprising the steps of:

receiving a status message over the upstream channel, the status message indicating that the remote interface unit has become time-synchronized with the network control facility; and decreasing the variable time period portion by the predetermined quantity of time.

26. The method of claim 19, further comprising the steps of:

determining whether a predetermined period of time has expired since receipt of the acknowledgment; and in the event that the predetermined period of time has expired, decreasing the variable time period portion by the predetermined quantity of time.

27. The method of claim 19 wherein a timing reference in the remote interface unit is used to track a timing reference in the network control facility to support effective use of the transmission slots, the method further comprising the steps of:

measuring the difference in oscillations between the network control facility time reference oscillator and the remote interface unit oscillator by measuring the difference in the number of oscillations over an extended period, the accuracy of this measurement being directly related to the reciprocal of the measurement duration; and using this measured difference to support more accurate remote interface unit time reference tracking by adjusting the remote interface unit time reference to compensate for this measured difference.

28. The method of claim 16 wherein user information intended for a plurality of remote interface units is stored at the network control facility, wherein the network control facility determines that at least two of the intended remote interface units are in a first mode of operation, and wherein the step of communicating the control information comprises the step of:

broadcasting control information to the plurality of remote interface units in the first mode of operation over a first downstream channel, the control information instructing the plurality of remote interface units to transition from the first mode of operation to a second mode of operation, the first mode of operation consuming substantially less power than the second mode of operation.

29. A method for a remote interface unit to communicate in a two-way communication system, the method comprising the steps of:

operating in accordance with a first, low power mode of operation in which the remote interface unit is configured to receive control information from a network control facility over a first downstream channel;

receiving the control information over the first downstream channel;

responsive to receiving the control information, transitioning from the first mode of operation to a second mode of operation in which the remote interface unit is configured to receive at least user information from the network control facility over a second downstream channel, the second mode of operation consuming substantially more power than the first mode of operation and the second downstream channel operating at a higher transmission rate than the first downstream channel; and responsive to transitioning to the second mode of operation, the remote interface unit configured to communicate with the network control facility via an upstream channel, the upstream channel comprising a time division multiple access channel shared concurrently by a plurality of remote interface units.

30. The method of claim 29, further comprising the step of: transmitting an acknowledgment of receipt of the control information to the network control facility over the upstream channel responsive to receiving the control information.

31. The method of claim 30, wherein the upstream channel utilizes a transmission protocol in which information is communicated in allocated time slots, the method further comprising the step of:

synchronizing a timing reference of the remote interface unit with a timing reference of the network control facility responsive to receiving the control information.

32. The method of claim 31 further comprising the step of:

transmitting a status message over the upstream channel, the status message indicating that the remote interface unit has become time-synchronized with the network control facility.

33. The method of claim 31, wherein the control information includes an identification of a time slot in which the remote interface, unit is to communicate the acknowledgment over the upstream channel and wherein the step of transmitting the acknowledgment comprises the step of:

transmitting the acknowledgment in the time slot.

34. The method of claim 31, wherein the transmission protocol comprises the upstream transmission protocol specified in the Data-Over-Cable Service Interface Specification (DOCSIS).

35. The method of claim 34, wherein the acknowledgment comprises one of a DOCSIS periodic ranging and an initial ranging response message.

36. The method of claim 34, wherein the control information comprises one of a DOCSIS periodic ranging and an initial ranging response message.

* * * * *